US010080066B2

(12) United States Patent
Rao et al.

(10) Patent No.: US 10,080,066 B2
(45) Date of Patent: Sep. 18, 2018

(54) RENDERING A VIRTUAL MARK ON A VIDEO FRAME

(71) Applicant: Disney Enterprises, Inc., Burbank, CA (US)

(72) Inventors: Cen Rao, Newtown, PA (US); Ximin Gong, Belle Mead, NJ (US); Nikhil Deshpande, Pennington, NJ (US); Ilke Akin, Morrisville, PA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/244,599

(22) Filed: Aug. 23, 2016

(65) Prior Publication Data

US 2017/0223431 A1    Aug. 3, 2017

Related U.S. Application Data

(60) Provisional application No. 62/289,175, filed on Jan. 29, 2016.

(51) Int. Cl.
*H04N 21/81* (2011.01)
*H04N 21/2187* (2011.01)
*G06T 19/00* (2011.01)
*H04N 21/234* (2011.01)
*G06T 7/00* (2017.01)

(52) U.S. Cl.
CPC ....... *H04N 21/8146* (2013.01); *G06T 7/0081* (2013.01); *G06T 19/006* (2013.01); *H04N 21/2187* (2013.01); *H04N 21/23418* (2013.01); *G06T 2207/10016* (2013.01); *G06T 2207/20144* (2013.01); *G06T 2207/30204* (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 5,917,553 A * | 6/1999 | Honey | ............... | G01S 3/7865 348/157 |
| 7,230,653 B1 * | 6/2007 | Overton | ............... | G06T 19/00 348/584 |
| 2006/0246973 A1 * | 11/2006 | Thomas | ............... | A63F 13/42 463/4 |
| 2009/0128667 A1 * | 5/2009 | Gloudemans | ......... | G06T 7/60 348/241 |

(Continued)

*Primary Examiner* — Kee M Tung
*Assistant Examiner* — Grace Q Li
(74) *Attorney, Agent, or Firm* — Ference & Associates LLC

(57) ABSTRACT

One embodiment provides a method for rendering a virtual mark on a video frame, including: receiving the video frame, captured by a camera, comprising a scene; obtaining a three-dimensional model of a mark in the scene; obtaining a foreground mask of the video frame; denoting a predetermined region corresponding to a mark mask, wherein the mark mask is an image projection of the mark on the video frame; updating the mark mask to exclude foreground regions, wherein the updating comprises: partitioning the predetermined region into a plurality of segments; and filtering out, from the mark mask, foreground pixels based on the plurality of segments and the foreground mask; and rendering, on the video frame, the virtual mark using the updated mark mask. Other aspects are described and claimed.

20 Claims, 8 Drawing Sheets

(56) References Cited

U.S. PATENT DOCUMENTS

| | | | |
|---|---|---|---|
| 2012/0314942 A1* | 12/2012 | Williams | G06T 19/006 382/164 |
| 2014/0237434 A1* | 8/2014 | Singh | G03F 1/36 716/51 |
| 2015/0278616 A1* | 10/2015 | Li | G06K 9/00825 382/103 |

* cited by examiner

RENDERING A VIRTUAL MARK ON A VIDEO FRAME

CLAIM FOR PRIORITY

This application claims priority to Provisional Application Ser. No. 62/289,175, filed on Jan. 29, 2016, the contents of which are incorporated by reference in their entirety.

BACKGROUND

Many users watch sports content (e.g., games, sporting events, etc.) at a remote location (e.g., home, a bar, at a friend's house, etc.), rather than the user being physically present at the sporting event. To view the sports content, users use an information handling device (e.g., a television, smart television, personal computer, mobile device, etc.). As technological advancement increases, the amount of information available to the viewer while watching the sports content on an information handling device also increases. Specifically, augmented reality techniques allow for insertion of enhancements (i.e., virtual elements such as graphics) into the broadcast video in a perspective that is consistent with the broadcast camera's perspective.

For example, a user watching the game on an information handling device, which allows for user interaction, can select a player and learn different statistics associated with that player. Some devices may insert statistics or other game related information onto the sports content or may alternatively direct the user to another information location (e.g., website, database, etc.). As another example, commentators may provide graphical inputs explaining a play occurring during the event. While explaining the play, the broadcaster may provide additional content, for example, by drawing circles or lines on a screen, which is then visible to the viewer of the content. Some information may also be inserted automatically by a system. For example, the system may automatically update score or possession information for the viewer.

BRIEF SUMMARY

In summary, an embodiment provides a method for rendering a virtual mark on a video frame, comprising: receiving the video frame, captured by a camera, comprising a scene; obtaining a three-dimensional model of a mark in the scene; obtaining a foreground mask of the video frame; denoting a predetermined region corresponding to a mark mask, wherein the mark mask is an image projection of the mark on the video frame; updating the mark mask to exclude foreground regions, wherein the updating comprises: partitioning the predetermined region into a plurality of segments; and filtering out, from the mark mask, foreground pixels based on the plurality of segments and the foreground mask; and rendering, on the video frame, the virtual mark using the updated mark mask.

Another embodiment provides a system for rendering a virtual mark on a video frame, comprising: an electronic device that includes a processor; a memory device that stores instructions executable by the processor to: receive the video frame, captured by a camera, comprising a scene; obtain a three-dimensional model of a mark in the scene; obtain a foreground mask of the video frame; denote a predetermined region corresponding to a mark mask, wherein the mark mask is an image projection of the mark on the video frame; update the mark mask to exclude foreground regions, wherein to update comprises: partitioning the predetermined region into a plurality of segments; and filtering out, from the mark mask, foreground pixels based on the plurality of segments and the foreground mask; and render, on the video frame, the virtual mark using the updated mark mask.

A further embodiment provides a program product, comprising: a computer readable storage device having code embodied therewith, the code being executable by a processor and comprising: code that receives the video frame, captured by a camera, comprising a scene; code that obtains a three-dimensional model of a mark in the scene; code that obtains a foreground mask of the video frame; code that denotes a predetermined region corresponding to a mark mask, wherein the mark mask is an image projection of the mark on the video frame; code that updates the mark mask to exclude foreground regions, wherein the code that updates comprises: code that partitions the predetermined region into a plurality of segments; and code that filters out, from the mark mask, foreground pixels based on the plurality of segments and the foreground mask; and code that renders, on the video frame, the virtual mark using the updated mark mask.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the embodiments will be pointed out in the appended claims.

DETAILED DESCRIPTION

Figure 1:
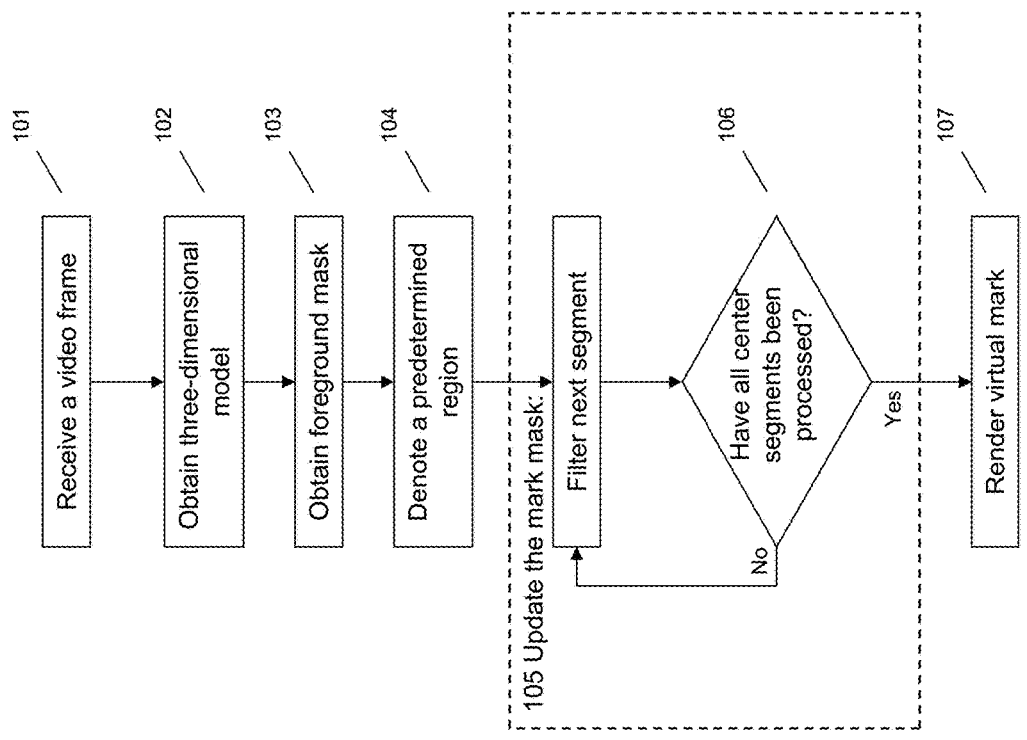
FIG. 1 illustrates an example method of rendering a virtual mark on a video frame.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation. The following description is intended only by way of example, and simply illustrates certain example embodiments.

Many users watch sports content at a location other than the sporting event venue. Since the sporting content is consumed using an information handling device, broadcast stations may provide the viewers with additional information, known in the art as enhancements. For example, some systems may provide a user with information that is enhances the sports content—virtual content. For example, while watching a football game, a user may be provided with first-down lines, scrimmage lines, and the like. Such content is generally projected (i.e., inserted) into the broadcast video image using a perspective that matches the broadcast camera's perspective. In other words, it appears to the viewer that the virtual content is actually a part of the real-world's scene at the football field. As an example, the line of scrimmage that is populated by the system looks to be a part of the football field. In order to provide such seamless content, the additional content has to be rendered with the correct camera's perspective and with accounting for dynamic foreground regions in the video. In other words, the additional content needs to appear behind the dynamic foregrounds—such as players and playing objects—as if it was part of the background.

Some methods for providing content as part of a foreground or background include utilizing chromakey systems. The traditional chromakey systems utilize color information extracted from the image's pixels (i.e., two-dimensional (2D) color information). However, each pixel only provides color values and limited regional and/or topological information such as connected component information. Another method includes a video layer segmentation method. Such a method is designed to identify the background and foreground of the image or scene. However, this method also suffers from the same problems as the traditional chromakey systems. Since these systems use the color values from adjacent pixels, the systems often incorrectly identify the pixels. For example, if a user wants to focus on the background, the pixels may be incorrectly identified as foreground pixels. As another example, if a user is attempting to focus on a specific object or location in the video frame, the pixels may be incorrectly attributed to a different object.

These problems are highlighted during sports content. For example, if a system is attempting to place a pointer line (a virtual mark) on the video frame of the sporting event, the system may have difficulty distinguishing between pixels belonging to the field (i.e., background pixels) and pixels belonging to players (i.e., foreground pixels) when rendering the line into the video image. As an example, the system may be attempting to highlight the three-point line of a basketball game. One of the problems with highlighting this line is that the basketball court is highly reflective, causing the color on the court to change dramatically. This makes it very difficult to use traditional methods to render the desired virtual three-point line. Additionally, the three-point line is often the same color as the players' uniforms. This makes it difficult to determine whether a pixel should be attributed to the three-point line (i.e., background) or the player (i.e. foreground). Another problem lies in the fact that a three-point line is an arc. A virtual three-point line generated by traditional chromakeying algorithms contains large amounts of zig-zag at the arc's edges. One of the reasons for this large amount of zig-zag is that the accuracy of pixel classifications is limited causing an aliasing problem.

Accordingly, embodiments provide systems, methods, and products for rendering a virtual mark on a video frame that overcomes the problems discussed above. An embodiment may receive a video frame comprising a scene. For example, an embodiment may receive a video frame of a live sporting event. An embodiment may then obtain a three-dimensional (3D) model of the scene. For example, the system may be provided with a dimension map of the scene (e.g., a basketball court dimension map, a football field dimension map, a baseball field dimension map, etc.). An embodiment may additionally obtain a foreground mask of the video frame. The foreground mask may identify the objects (e.g., players, spectators, referees, playing objects, etc.) that are part of the foreground of the image, indicating the regions in the image that should not be drawn or marked over.

Using the scene's 3D model, an embodiment may denote a mark; the mark may be a three-dimensional (3D) graphic (e.g., three-point line, line of scrimmage, first down line, etc.) corresponding to a mark mask. The mark mask may be a binary image, indicative of the region in the video frame that the mark (e.g., 3D graphic) may be mapped to. However, this mark mask may provide only an approximate location of the background image region. In other words, the mark mask may include some foreground image regions. An embodiment may then update the mark mask to exclude the foreground regions. Updating the mark mask may include partitioning a predetermined region, including the mark mask region, into a plurality of segments and then filtering out pixels of the mark mask that are determined to be foreground pixels based on an analysis of the foreground mask in regions within the plurality of segments. An embodiment may then render a virtual mark into the video frame image using the updated mark mask. The rendered virtual mark may appear to be a part of the background to viewers. In other words, the rendered virtual mark may be behind the players or other foreground objects. As an example, an embodiment may provide a rendering of a virtual three-point line over the actual three-point line that appears to be part of the basketball court.

The illustrated example embodiments will be best understood by reference to the figures. The following description is intended only by way of example, and simply illustrates certain example embodiments.

Figure 2:
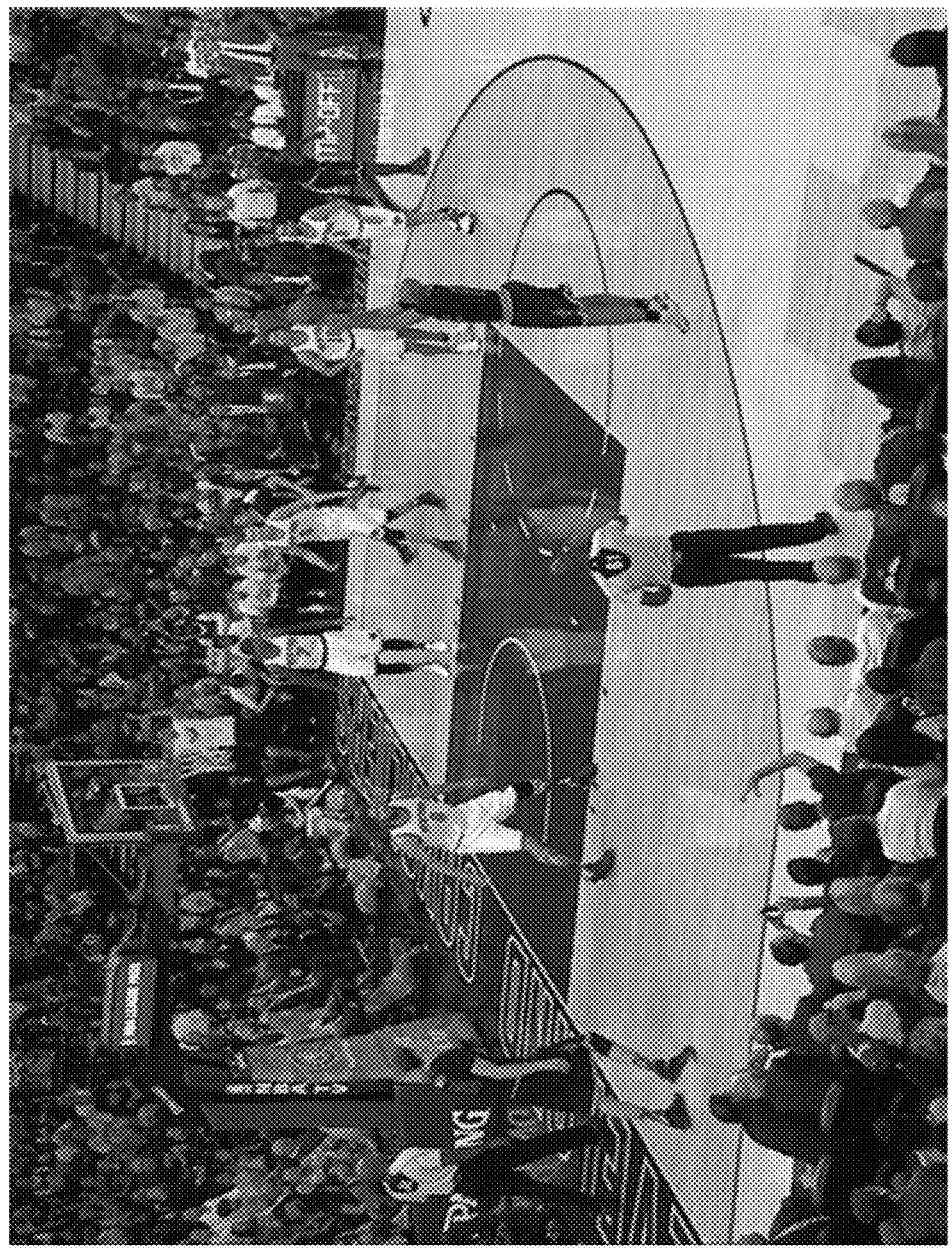
FIG. 2 illustrates an example scene captured from a video frame.

Referring to FIG. 1, at 101 an embodiment may receive a video frame, captured by one or more cameras, comprising a scene, for example, as shown in FIG. 2. To receive the video frame the cameras capturing the video may feed the video to the system. An embodiment may also receive the video frame from another location, for example, a local, remote, or cloud storage location. For example, the video frame may have been previously recorded and stored. The cameras that are capturing or have previously captured the video frame(s) may be calibrated to provide 3D position information of each pixel within the video frame. The calibrated camera information may be provided as a camera projection matrix. The scene may include sports content, for example, a basketball court, a football field, a soccer field, a baseball field, and the like.

At 102, an embodiment may obtain a three-dimensional (3D) model of a scene and a mark within the scene. The 3D model may include a dimension map. For example, the 3D model may include a basketball court dimension map, a football field dimension map, etc. The dimension map may be a general dimension map, or may, alternatively, be a dimension map specific to the scene in the video frame. In other words, the dimension map may be a dimension map for the specific sporting venue that is included in the video frame. The 3D model may identify the location of objects within the scene without any foreground objects (e.g., players, referees, spectators, playing objects, etc.). In other words, the 3D model may only include those things which would be considered background elements in a video frame. The 3D model may also identify the distance and dimensions of objects of the scene. For example, the 3D model may identify how far apart goals are on a football field. Additionally, the 3D model may identify the geometry and location (e.g., coordinates, distance from other objects, etc.) of marks (e.g., yard lines, three-point lines, base running lines, out-of-bounds lines, etc.) within the scene.

Figure 3:
FIG. 3 illustrates an example foreground mask.

At 103 an embodiment may obtain a foreground mask of the video frame. An example of a binary foreground mask of the scene from FIG. 2 is shown in FIG. 3. Therein, dynamic objects (e.g., players, referees, spectators, playing objects, etc.) are indicated in black and considered to be the foreground of the video frame. The foreground mask may be generated using various methods in the art, such as methods based on color models of either foreground regions, background regions, or both. The foreground mask may be generated by the system or may be obtained from another source.

Figure 4:
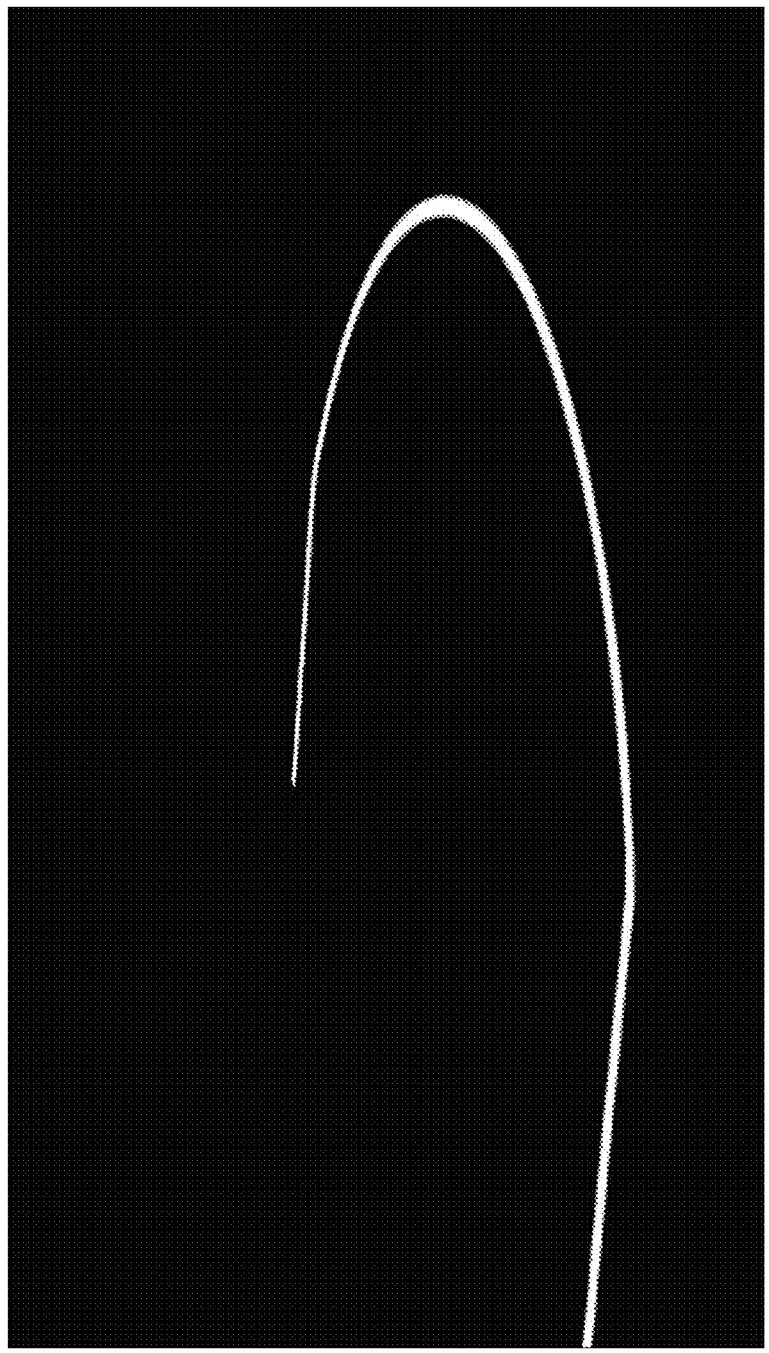
FIG. 4 illustrates an example of a mark mask.

Using the 3D model and the video frame, a predetermined region including the mark mask, may be denoted in the video frame at 104. The mark mask may be a binary image that indicates the area in the video frame that corresponds to the image projection of the mark from the 3D model of the scene. An example mark mask can be seen in FIG. 4. As shown, the mark mask reflects the entire mark without taking into account occluding foreground objects. In rendering the mark mask, an art rasterization algorithm may be used to generate a smooth and continuous mark mask. To generate the mark mask, the mark's 3D model may be projected onto the video frame using the camera projection matrix. For example, if the scene includes a basketball game, the 3D model of the basketball court may be projected onto the video frame to identify locations of areas of interest. For example, if a virtual three-point line is to be rendered over the actual three-point line, the arc's 3D model may be used to identify the approximate location of the three-point line within the video frame.

Figure 5:
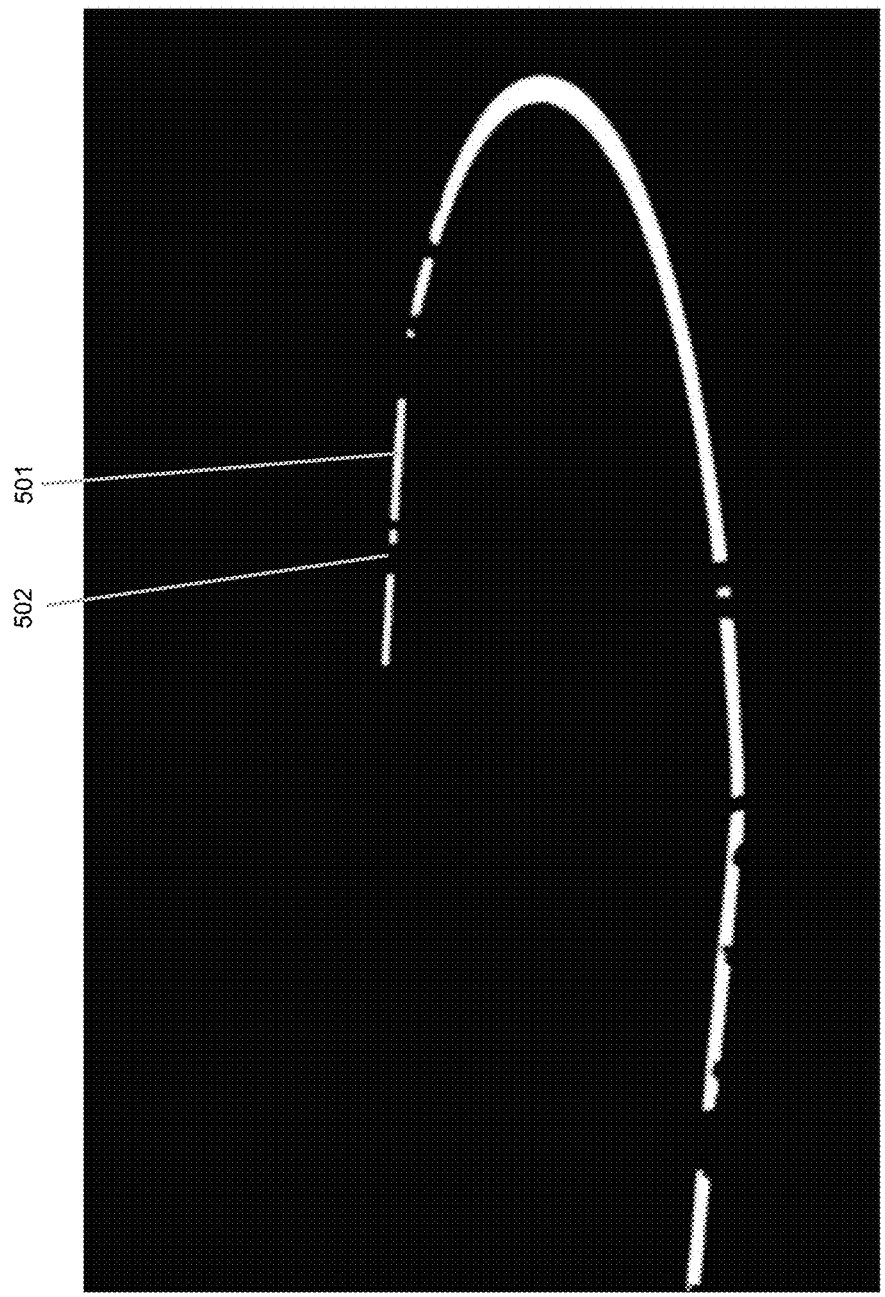
FIG. 5 illustrates an example of a mark mask cut with foreground objects.

To generate a more accurate mark that includes only the background region of the scene, an embodiment may update the mark mask at 105 to exclude foreground regions. Once the mark mask has been updated the mark mask will reflect the foreground objects. According to embodiments of this invention, the foreground mask may be used to identify pixels within the mark mask that are likely to be part of a foreground object and, therefore, should be excluded. In other words, the mark mask 501 as shown in FIG. 5 may be occluded at the locations of foreground objects 502.

In identifying which pixels of the mark mask should be excluded as foreground regions, known methods refer to the corresponding pixels in the foreground mask. In the foreground mask, pixels may be allocated as foreground or background pixels based upon features such as color values and regional/topological information. Using such techniques, some of the pixels may be incorrectly allocated as foreground or background pixels. As an example, if the arc is the same color as a player's jersey, some pixels of the arc may be allocated to the foreground because the color value matches the color value of the jersey. Additionally, some of the background pixels may be incorrectly attributed as foreground pixels due to variations in the theme. As an example, a basketball court is highly reflective and may reflect some of the colors of a nearby video board, which may cause the system to attribute some of the pixels corresponding to the floor as foreground pixels.

Figure 6:
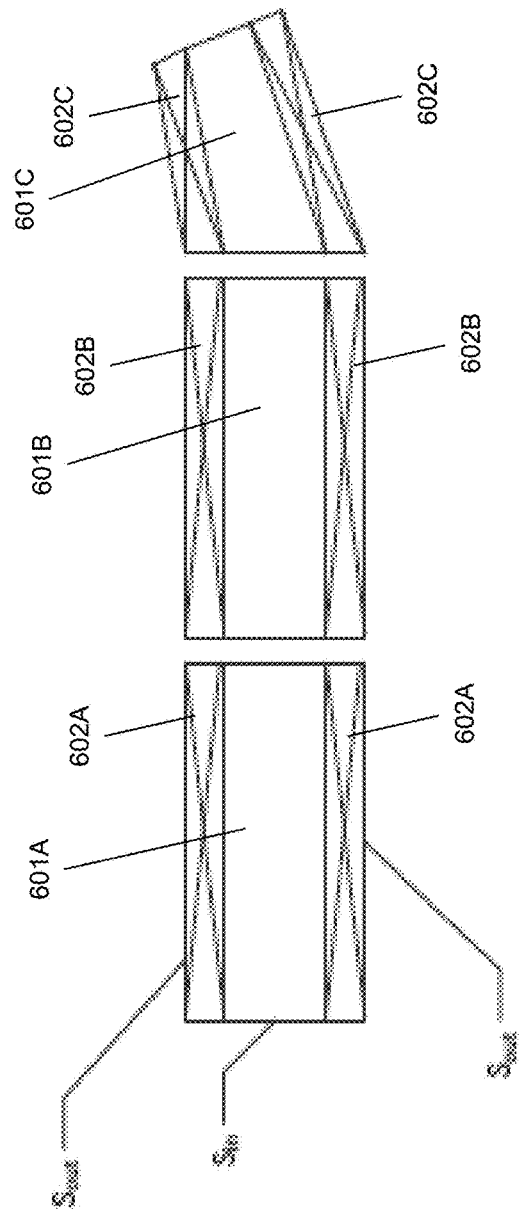
FIG. 6 illustrates an example of mark mask center segments and boundary segments.

Therefore, during updating of the mark mask, according to embodiments of this invention, the pixels which have been incorrectly attributed may be filtered and reallocated to the correct foreground or background. Part of the filtering may include using the information from the 3D model, for example, the geometry or location of the predetermined region. Referring to FIG. 6, to further filter the mark mask, the predetermined region may be partitioned into a plurality of center segments 601A, 601B, and 601C, also denoted as $S_{in}$. The size of the plurality of segments may be determined using trial and error or through the use of an optimization algorithm. Each center segment may not be the same size as other center segments. For example, a center segment on a section of the predetermined region being mostly straight may be longer than a center segment around a curve.

An embodiment may also generate boundary segments 602A, 602B, and 602C, also denoted as $S_{out}$, for each of the $S_{in}$ segments. The boundary segments 602(A, B, and C), which include the regions covered by an "X" in FIG. 6, may be the regions outside of and along the boundaries of the center segments 601(A, B, and C). Hence, the predetermined region may include both $S_{in}$ and $S_{out}$ segments. The boundary segments 602 may be on either side of the segment 601(A, B, and C), as shown in FIG. 6. The shapes and dimensions of the center segments 601(A, B, and C) and boundary segments 602(A, B, and C) may be a function of one of the intrinsic and extrinsic parameters of the camera as well as the segment's position within the mark's 3D model. In some embodiments, the boundary segment regions may overlap the center segment regions or may overlap the neighboring center segments or boundary segments. In other words, the boundaries of the boundary segments do not need to match, line up, or correspond to the boundaries of the center segments; rather, the $S_{in}$ segments may substantially overlap the mark mask and the $S_{out}$ segments may substantially be external to the mark mask.

Once the predetermined region has been partitioned into center segments and corresponding boundary segments, an embodiment may analyze the foreground mask in regions corresponding to these segments to determine which pixels of the mark mask are foreground pixels and which are background pixels. To perform this filtering, an embodiment may analyze the boundary segments. If the analysis of these boundary segments supports an inference that the pixels within the boundary segments are background pixels, then the center segment may be designated as a background object. The pixels within this center segment would then be labeled as background pixels. If, however, the analysis of the boundary segments supports an inference that the pixels within the boundary segments are foreground pixels, then the center segment may be designated as a foreground object. As an example, referring back to FIG. 6, if the boundary segments 602A support the inference that they include foreground pixels, then the segment 601A may be designated as a foreground object and the pixels of the segment 601A may be allocated as foreground pixels.

The analysis of each or combined boundary segments may comprise a simple voting scheme, in which it may be determined if a majority of the pixels are background or foreground pixels. Each boundary segment would then be identified as background or foreground depending on the pixels having the majority. Other filtering analysis techniques may also be used to identify the pixels as background or foreground. The analysis technique may use the color of the pixels to identify the appropriate allocation. The analysis may also use additional information, for example, texture information, of the pixels. Texture of the pixels may be computed using different techniques, for example, local binary pattern analysis. If an embodiment determines that all the center segments have not be processed at 106, it may continue to analyze all segments until all pixels within the mark mask are correctly designated as belonging to either background or foreground regions.

Figure 7:
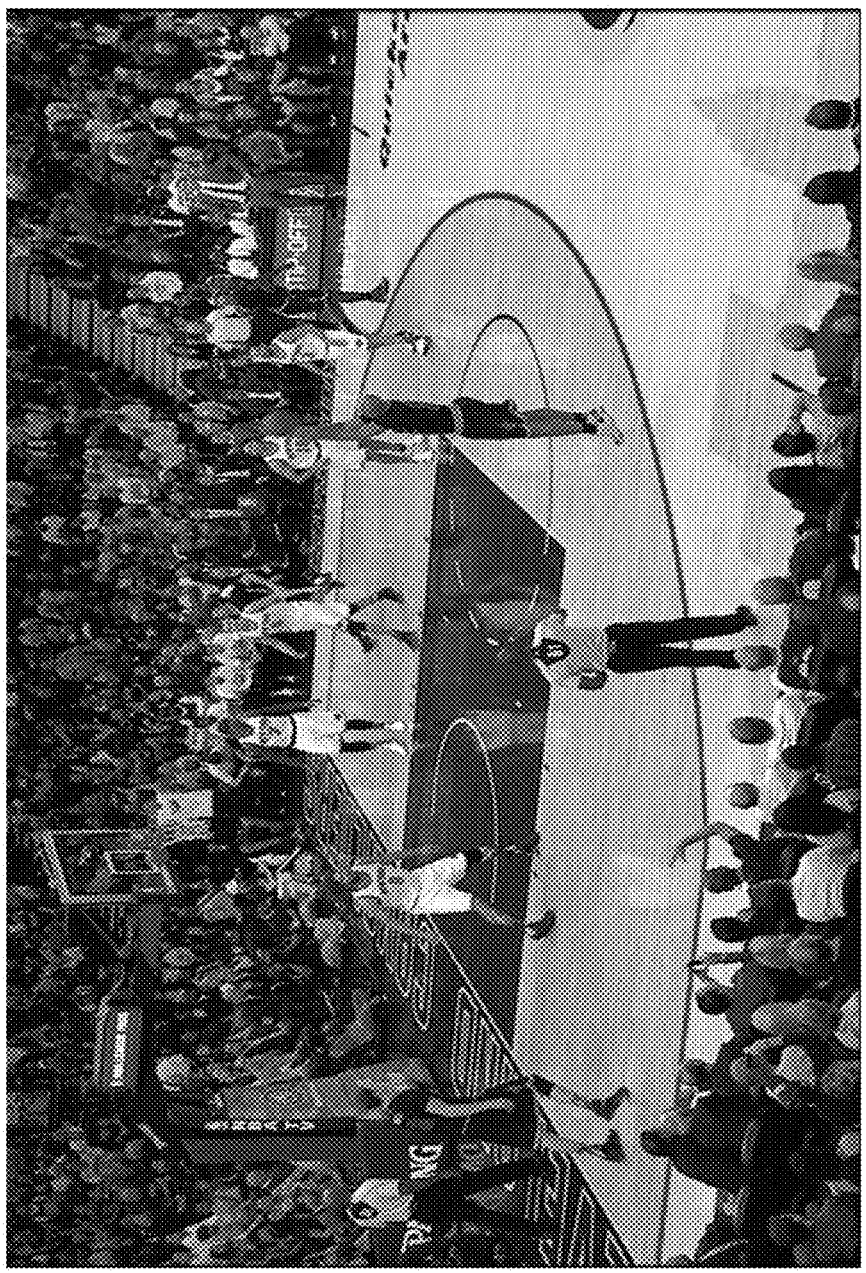
FIG. 7 illustrates an example of a resulting video frame with a virtual mark.

Once all the foreground regions have been excluded from the mark mask, resulting in the updated mark, an embodiment may render a virtual mark at 107 into the video frame, for example, as shown in FIG. 7. Due to the fact that FIG. 7 is in black and white, the virtual line covering the three-point line is difficult to distinguish. However, it should be understood that a virtual mark has been rendered over the three-point line. The virtual mark may include a line that is a different color from the original line. In rendering the virtual mark an embodiment may use the updated mark mask so that the rendered virtual mark avoids occluding the foreground regions. Thus, the rendered virtual mark may only contain pixels which have been marked or allocated as background pixels. In other words, the virtual mark may appear to be part of the background of the video frame and not cover any of the foreground objects. Even though used as an example, a virtual mark over an actual mark in the scene is not required. For example, an embodiment may provide a virtual mark connecting two points within the video frame or scene even though a line does not actually exist within the scene.

In one embodiment, the virtual mark may only be rendered at a particular timeframe or in response to an event of interest occurring in the scene. Any known in the art video based processing or sensor based processing may be used to detect the event of interest. For example, if the virtual mark comprises a virtual three-point line, an embodiment may only render the virtual mark when a player is attempting a three-point shot. One embodiment may detect a player with a ball and the location of the player's feet when the ball leaves the player's hands using video based processing. If the player's feet are outside the 3-point line, then the virtual three-point line may be rendered designating to those watching that a three-point attempt is being made. In one embodiment, detection of the player's feet may be completed using sensors such as pressure or photon sensitive material at the outer edge of the three-point line. As an alternative, the system may detect the referee's hand gesture that is made when the player is attempting a three-point shot by processing the referee's image in the video or by using sensors (e.g., radio frequency identification (RFID) tags, etc.) attached to the referee's hands. If the referee's hand is detected in the proper configuration, then the system may render the virtual three-point line. Any automatic, manual, or a combination thereof method may be used to indicate a live event that may trigger the rendering of a virtual mark into the event's video coverage, according to embodiments of this invention.

Figure 8:
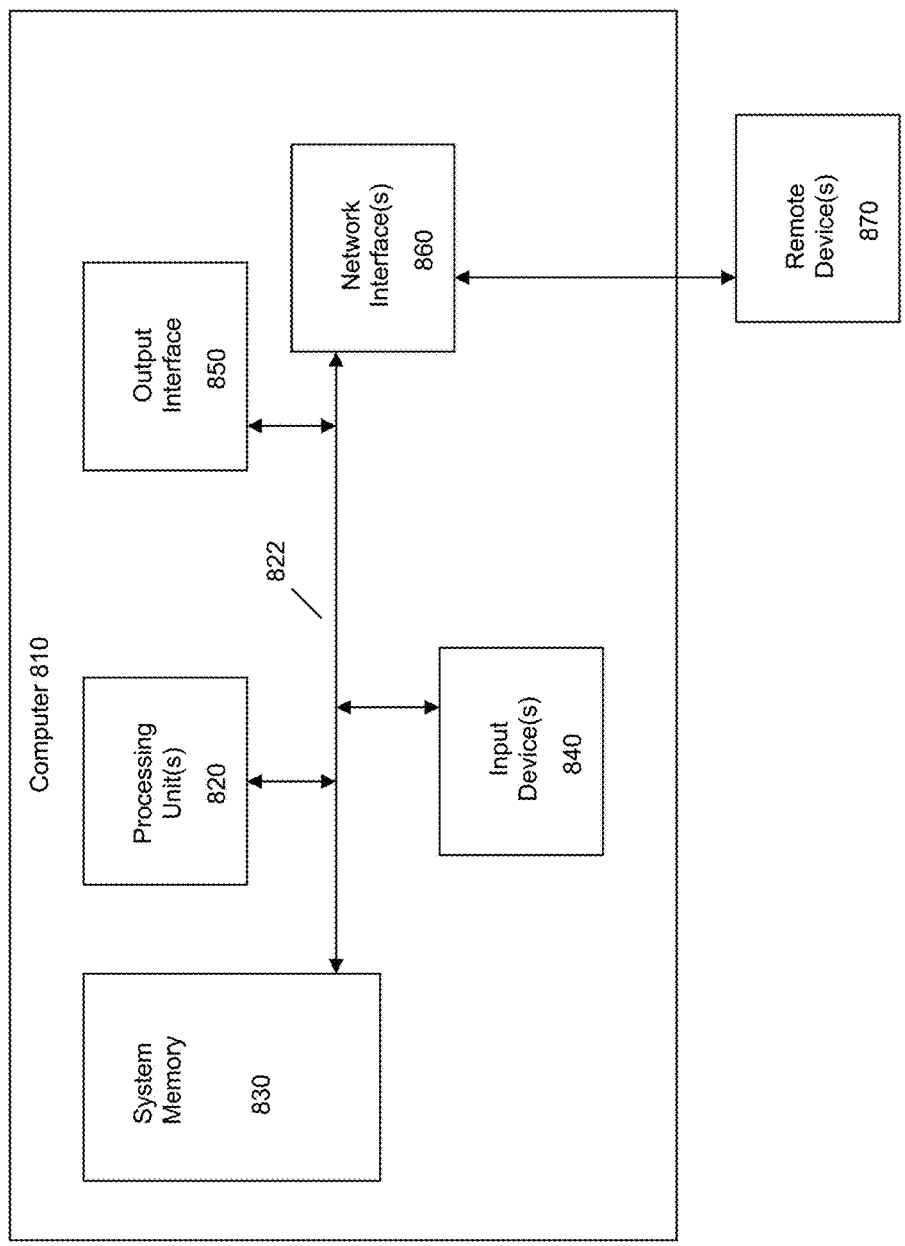
FIG. 8 illustrates an example electronic device.

It will be readily understood by those having ordinary skill in the art that a variety of computing devices may be employed in implementing various embodiments. By way of illustration only, in FIG. 8 is illustrated an example device that may be used in implementing embodiments. The device 810 may take the form of a computer, a smart phone or a tablet device. Components of the device 810 may include, but are not limited to, at least one processing unit 820, a system memory 830, and a system bus 822 that couples various system components including the system memory 830 to the processing unit(s) 820. The device 810 may include or have access to a variety of computer readable media. The system memory 830 may include computer readable storage media in the form of volatile and/or non-volatile memory such as read only memory (ROM) and/or random access memory (RAM). By way of example, and not limitation, system memory 830 may also include an operating system, application programs, other program modules, and program data, as described herein.

A user can interface with (for example, enter commands and information) the device 810 through input devices 840. A monitor or other type of display device can also be connected to or integrated with the system bus 822 via an interface, such as an output interface 850. In addition to a monitor, devices may also include other peripheral input or output devices. The device 810 may operate in a networked or distributed environment using logical connections (network interface 860) to other remote computers, databases, sensors or devices (remote device(s) 870). The logical connections may include a network, such as a local area network (LAN) or a wide area network (WAN), or a cellular network, a short range wireless connection such as BLUETOOTH short range wireless communication techniques or NFC type communication, e.g., RFID, but may also include other networks or communication types.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic device such as a random access memory (RAM), a read-only memory (ROM), an erasable programmable read-only memory (EPROM or Flash memory), or any suitable device. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for rendering a virtual mark on a video frame, comprising:
   receiving the video frame, captured by a camera, comprising a scene;
   obtaining a three-dimensional model of a mark in the scene, wherein the three-dimensional model identifies locations of objects within the scene;
   obtaining a foreground mask of the video frame;
   denoting a predetermined region corresponding to a mark mask, wherein the mark mask is an image projection of the mark on the video frame and wherein the denoting comprises projecting the three-dimensional model onto the video frame to identify a location of the mark;
   updating the mark mask to exclude foreground regions from the mark mask, wherein the updating comprises:
      identifying, based on the foreground mask, pixels of the mark mask attributable to at least one foreground object and excluding the identified pixels; and
      reallocating a pixel incorrectly attributed to at least one of a background object and a foreground object by partitioning the predetermined region into a plurality of segments and analyzing the plurality of segments using the foreground mask; and
   filtering out, from the mark mask, foreground pixels; and
   rendering, on the video frame, the virtual mark using the updated mark mask.

2. The method of claim 1, wherein the plurality of segments comprise center segments that substantially overlap the mark mask and boundary segments that are substantially external to the mark mask.

3. The method of claim 2, wherein the filtering comprises analyzing at least one boundary segment for each of the center segments to determine if the at least one boundary segment comprises foreground pixels.

4. The method of claim 3, wherein the pixels of each of the center segments are identified as foreground pixels if the boundary segments corresponding to each of the center segments are determined to comprise foreground pixels.

5. The method of claim 1, wherein a size of the plurality of segments is determined using an optimization algorithm.

6. The method of claim 1, wherein the filtering comprises using the three-dimensional model and geometry of the predetermined region to filter out false identification of foreground pixels.

7. The method of claim 1, wherein the rendering is performed in response to at least one detected event in the scene.

8. The method of claim 7, wherein the at least one detected event in the scene is detected based on at least one of a video based processing and a sensor based processing.

9. The method of claim 1, wherein the predetermined region comprises a three-point line of a basketball court.

10. The method of claim 9, wherein the rendering comprises rendering a virtual mark when a player is attempting a three-point shot.

11. A system for rendering a virtual mark on a video frame, comprising:
    an electronic device that includes a processor;
    a memory device that stores instructions executable by the processor to:
    receive the video frame, captured by a camera, comprising a scene;
    obtain a three-dimensional model of a mark in the scene, wherein the three-dimensional model identifies locations of objects within the scene;
    obtain a foreground mask of the video frame;
    denote a predetermined region corresponding to a mark mask, wherein the mark mask is an image projection of the mark on the video frame and wherein the denoting comprises projecting the three-dimensional model onto the video frame to identify a location of the mark;
    update the mark mask to exclude foreground regions from the mark mask, wherein to update comprises:
       identifying, based on the foreground mask, pixels of the mark mask attributable to at least one foreground object and excluding the identified pixels; and
       reallocating a pixel incorrectly attributed to at least one of a background object and a foreground object by partitioning the predetermined region into a plurality of segments and analyzing the plurality of segments using the foreground mask; and
    filtering out, from the mark mask, foreground pixels; and
    render, on the video frame, the virtual mark using the updated mark mask.

12. The system of claim 11, wherein the plurality of segments comprise center segments that substantially overlap the mark mask and boundary segments that are substantially external to the mark mask.

13. The system of claim 12, wherein to filter comprises analyzing at least one boundary segment for each of the center segments to determine if the at least one boundary segment comprises foreground pixels.

14. The system of claim 13, wherein the pixels of each of the center segments are identified as foreground pixels if the boundary segments corresponding to each of the center segments are determined to comprise foreground pixels.

15. The system of claim 11, wherein a size of the plurality of segments is determined using an optimization algorithm.

16. The system of claim 11, wherein to filter comprises using the three-dimensional model and geometry of the predetermined region to filter out false identification of foreground pixels.

17. The system of claim 11, wherein to render is performed in response to at least one detected event in the scene.

18. The system of claim 17, wherein the at least one detected event in the scene is detected based on at least one of a video based processing and a sensor based processing.

19. The system of claim 11, wherein the predetermined region comprises a three-point line of a basketball court.

20. A program product, comprising:
a computer readable storage device having code embodied therewith, the code being executable by a processor and comprising:
code that receives the video frame, captured by a camera, comprising a scene;
code that obtains a three-dimensional model of a mark in the scene, wherein the three-dimensional model identifies locations of objects within the scene;
code that obtains a foreground mask of the video frame;
code that denotes a predetermined region corresponding to a mark mask, wherein the mark mask is an image projection of the mark on the video frame and wherein the denoting comprises projecting the three-dimensional model onto the video frame to identify a location of the mark;
code that updates the mark mask to exclude foreground regions from the mark mask, wherein the code that updates comprises:
code that identifies, based on the foreground mask, pixels of the mark mask attributable to at least one foreground object and excluding the identified pixels; and
code that reallocates a pixel incorrectly attributed to at least one of a background object and a foreground object by partitioning the predetermined region into a plurality of segments and analyzing the plurality of segments using the foreground mask; and
code that filters out, from the mark mask, foreground pixels; and
code that renders, on the video frame, the virtual mark using the updated mark mask.

* * * * *